Patented Mar. 3, 1953

2,629,919

UNITED STATES PATENT OFFICE 2,629,919

METHOD OF APPLYING FOAMED RUBBER LATEX TO A PERMEABLE BACKING

Victor Golden, Somerville, N. J.

No Drawing. Application June 25, 1952, Serial No. 295,570

4 Claims. (Cl. 28—72.5)

This is a continuation-in-part of application Serial No. 85,467, filed April 4, 1949, now abandoned, and relates to a method of applying a foamed latex sponge backing to carpets, rugs, mats and the like.

Heretofore a rubber backing has been generally applied to various kinds of materials by either adhesively securing a preformed sheet of rubber or by treating the base material with rubber dissolved in a solvent so that upon evaporation of the solvent a rubber coating remains. In other cases latex sponge has been obtained as a backing by "blowing up" latex in place.

It is the purpose of this invention to permit the ready application of a foamed latex sponge backing of any desired thickness to any permeable surface so that it becomes an integral part thereof. Another object is to permit such a backing to be supplied economically and quickly without detracting from the intended appearance and use of the material to which it is attached. Other objects will be apparent from the description which follows.

This invention in its simplest application consists of applying a natural or a synthetic latex compound, which has been whipped into a foam, directly to the fabric, leather, paper, or other permeable surface as may be selected and treated as hereinafter described and thereafter drying and curing.

For a better understanding of the detailed description which follows, the following definitions are given of certain terms employed herein:

"Foam latex compound"—any latex compound capable of being foamed, i. e. of having bubbles incorporated therein, and retentive of a sufficient quantity of such bubbles so as to have a cellular or sponge like structure upon setting.

"Foamed latex sponge"—a foamed latex compound after water has ceased to be the external phase.

"Anti-foaming agent"—any material tending to defoam a foamed latex compound by release of bubble entrapped gases upon contact therewith.

A satisfactory foam latex compound that may be employed is as follows:

| | Parts, dry weight |
|---|---|
| Natural latex, centrifuged, 60% | 100 |
| Sulfur | 2 |
| Zinc oxide | 3 |
| Butyl zimate | 2 |
| Phenyl beta naphthylamine | 1 |
| Casein | 0.5 |
| Nacconal NR (a trade name for sodium alkyl aryl sulfonate) | 0.5 |
| Aquarex D (a trade name for sodium salts of sulfate monesters of a mixture of higher fatty alcohols, chiefly lauryl and myristyl) | 0.5 |
| 2-nitro 2-methyl 1-propanol | 3.0 |

The above compound is whipped into a froth or foam in a planetary type mixer such as a Hobart mixer and is then, in the simplest application of this invention, applied directly to the material by either spraying, spreading or trowelling it thereon. Thereafter it may be dried and cured for thirty minutes at 250° F. providing the material with a bonded foamed latex sponge layer.

Equally useful are foams of GR–S latex, neoprene, and other synthetic latices and blends of either natural or synthetic latices or both combined wherein the dispersed phase is capable of producing desirable sponge properties. One or more types of latex may be used to produce a single backing, their selection depending upon the physical characteristics sought in the foam sponge layer, in its bonding surface and in any preliminary paint coat that may be used. The time of setting and the temperatures employed in drying and curing the latices used will depend upon the requirements of each and the properties sought from each.

In most applications a flexible sponge backing will be desired but a rigid sponge backing may also be secured by proper selection of the latex compound.

The tendency of the foamed latex upon coming into contact with the material to which it is applied, is to liquefy at points of contact and the resulting liquid penetrates or soaks into the material and forms an anchorage for the rest of the applied layer of foam. I have found that the degree of liquefication and penetration into the material is highly important to the bonding value between the material and the foamed latex sponge. Liquefication is increased by the use of an anti-foaming agent. Penetration is improved by the use of a wetting agent that is not inimical to liquefication.

I have found that the following materials function as anti-foaming agents in the manner as hereinbefore described by me, when employed in my method of securing a foamed latex sponge backing:

Tributyl phosphate
Di isobutyl carbinol
2-ethyl hexanol
Trimethyl nonyl alcohol
White mineral oil
Pine oil
Naphtha
Kerosene
Paraffin
Candelilla wax
Fatty alcohols
Isobutyl stearate
Glyceryl mono-oleate
Butyl stearate
Propylene glycol laurate I have also found that a mixture of 95 parts of pine oil with 5 parts of any one of the following, makes an excellent anti-foaming agent:

>Aluminum stearate
>Zinc stearate
>Calcium stearate
>Barium stearate
>Aluminum oleate
>Calcium oleate I am aware that certain of the foregoing materials possess other properties, as for example, the ability to coagulate the latex or dissolve the rubber particles, but I do not employ them for that purpose. It is their ability to destroy the bubbles which make up the foamy construction of the latex compound (and thus increase the fluidity of the compound) that adapts them to my method.

Taking as a specific example the backing of a carpet with a layer of foamed latex sponge with the use of an anti-foaming agent, I first coat, spray or saturate the under side of the carpet with an anti-foaming agent. Next, while such agent is still effective, I apply a natural or artificial latex compound, which has been whipped into a foam, to such surface by either spraying, trowelling or "doctoring" it thereon. Upon coming in contact with the pretreated material the foamed latex so exposed reverts to a latex compound of low viscosity, thereby producing increased penetration, wetting, adhesion and anchorage to the carpet. In applying the anti-foaming agent it is important that the quantity used be regulated so that the foam is liquefied only at the surface of the material and slightly beneath in order to avoid reducing the entire amount of the foam to a liquid. The permissible interval of time between application of the anti-foaming agent and the foamed latex depends upon the nature of such agent. A volatile anti-foaming agent, for example, will have a shorter effective life than more stable types.

If desired the carpet may, in addition to being treated with an anti-foaming agent, be treated with a wetting agent to further increase the wetting and penetration of the liquefied and unliquefied latex foam.

I have found that the following materials function as wetting agents when employed in the method I describe herein:

Fatty alcohol sulfates
Condensation products of ethylene oxide and organic acids
Water soluble polyethylene ether of a fatty alcohol
Sodium alkyl sufonate
Alkyl aryl sulfonate Individual components of a carpet, that is, the warp, filling or face yarns may be separately or collectively treated with an anti-foaming agent prior to the weaving of the carpet to give a selective penetration of the liquefied foam. For example, if penetration is required only at a point where the face yarns reach the back of the carpet, only the face yarns need be treated with anti-foaming agent. On the other hand, if it is desired to obtain a maximum bond between face yarns and filling shots, only the face yarn and filling shot need be treated and a liquefied foam will be liberated only at the points desired. This permits economy of application in that only a portion of the carpet is saturated with liquefied foam while the balance of the unliquefied foam is available for producing a greater bulk of foamed latex sponge.

Not only does this invention provide for a foamed latex sponge backing for carpets, but it serves to anchor the pile loops extending to the back of the carpet in such backing thus binding the pile to the carpet base.

This invention may also be applied to V-weave plush for producing a foamed latex sponge backed upholstery fabric. It may also be applied to artificial or natural leather to produce foamed latex sponge inner soles for shoes. In short, it may be applied wherever it is desired to obtain good anchorage, wetting, penetration or adhesion of a foamed latex sponge to a porous, fibrous or woven material, or other material having a permeable surface or a surface prepared to receive and hold it. Where such anchorage, wetting, penetration or adhesion is impaired because of lack of penetration of the foamed latex into the material, the use of an anti-foaming agent in combination with a wetting agent will increase the adhesion.

The selection of an anti-foaming agent and the regulation of the quantity used as the kind of material indicates, is important to avoid the reduction of too great an amount of foamed latex to liquid form.

When this invention is used with paper it is possible to saturate an alpha cellulose felt such as is commonly used in producing so called latex paper and simultaneously coat the same with foamed latex. This can be accomplished by first treating the paper with an anti-foaming agent or an anti-foaming and wetting agent and then applying the foamed latex. This will saturate the paper with defoamed latex and at the same time leave some residual foam on the surface.

Various modifications may be made in the practice of this invention without departing from the scope thereof and by referring to a specific example herein it is not intended to limit such scope.

What I claim is:

1. A method of applying and securing a foamed rubber sponge layer to a permeable surface comprising first impregnating such surface with a substance capable of defoaming and liquifying a foamed fluid rubber latex and next applying thereto, while such substance is still effective, a coating of a foamed fluid rubber latex compound whereby a portion thereof is defoamed on the interface, and then drying and curing the same.

2. In the process of adding a foamed rubber sponge layer to a permeable surface by applying a coating of a foamed fluid rubber latex compound thereto and then drying and curing the same, the preliminary preparation of such surface by the application thereto of a substance capable of defoaming and liquifying a foamed fluid rubber latex.

3. A method of increasing the depth of penetration of a foamed rubber sponge layer in a permeable surface, which consists in applying a substance capable of defoaming and liquifying a foamed liquid rubber latex to such surface prior to the application thereto of a coating of a foamed fluid rubber latex compound, and its drying and curing.

4. A method of applying and securing a foamed rubber sponge backing to a woven fabric, comprising the treatment before weaving of the back-face components thereof with a substance capable of defoaming and liquifying a foamed liquid rubber latex, weaving the said components into a woven fabric, the application after weaving to the backface thereof of a coating of a foamed fluid rubber latex compound, and the drying and curing of the same.

VICTOR GOLDEN.

REFERENCES CITED

The following references are of record in the file of this patent:

UNITED STATES PATENTS

| Number | Name | Date |
|---|---|---|
| 1,845,688 | Untiedt | Feb. 16, 1932 |
| 1,899,535 | Teague | Feb. 28, 1933 |
| 2,138,081 | Wolf | Nov. 29, 1938 |
| 2,187,140 | Faris | Jan. 16, 1940 |
| 2,567,951 | Lewis | Sept. 18, 1951 |